United States Patent
Biewer et al.

(10) Patent No.: US 7,793,702 B2
(45) Date of Patent: Sep. 14, 2010

(54) GUIDE SYSTEM FOR A ROLLER BLIND OF A SLIDING ROOF SYSTEM

(75) Inventors: Christian Biewer, Altheim (DE); Dirk Eis, Eppstein (DE); Horst Böhm, Frankfurt am Main (DE)

(73) Assignee: ArvinMeritor GmbH, Dietzenbach (DE)

( * ) Notice: Subject to any disclaimer, the term of this patent is extended or adjusted under 35 U.S.C. 154(b) by 265 days.

(21) Appl. No.: 11/967,313

(22) Filed: Dec. 31, 2007

(65) Prior Publication Data
US 2008/0179021 A1 Jul. 31, 2008

(30) Foreign Application Priority Data
Jan. 31, 2007 (EP) ................................. 07002092

(51) Int. Cl.
*B60J 3/00* (2006.01)
(52) U.S. Cl. ................. 160/370.22; 160/272; 160/273.1
(58) Field of Classification Search ................. 160/272, 160/273.1, 238, 268.1, 271, 313, 314; 296/141
See application file for complete search history.

(56) References Cited

U.S. PATENT DOCUMENTS

| 1,612,261 | A  | * | 12/1926 | Burns ........................ 160/273.1 |
| 1,840,454 | A  | * | 1/1932  | Kennedy .................. 160/273.1 |
| 5,526,865 | A  | * | 6/1996  | Coenraets ..................... 160/272 |
| 6,179,373 | B1 | * | 1/2001  | Bohm et al. .................. 296/214 |
| 7,114,766 | B2 | * | 10/2006 | Becher et al. ................. 296/214 |
| 7,114,767 | B2 | * | 10/2006 | Grimm et al. ................. 296/214 |
| 7,389,807 | B2 | * | 6/2008  | Nagare et al. ............. 160/273.1 |
| 7,530,630 | B2 | * | 5/2009  | Jugl et al. ..................... 296/214 |
| 2006/0027347 | A1 | * | 2/2006 | Boehm et al. ............. 160/273.1 |
| 2008/0179021 | A1 | * | 7/2008 | Biewer et al. ................ 160/243 |
| 2008/0225122 | A1 | * | 9/2008 | Sarao et al. ............. 348/207.11 |

* cited by examiner

*Primary Examiner*—Blair M. Johnson
(74) *Attorney, Agent, or Firm*—Carlson, Gaskey & Olds

(57) ABSTRACT

A guide system for a roller blind of a sliding roof system has a guide rail and a slider that is fixed on the roller blind. The slider is accommodated in the guide rail such that the slider is displaceable in a longitudinal direction of a vehicle and carries the roller blind. A pretensioning device is arranged between the guide rail and the slider. The pretensioning device presses the slider outwards transversely with respect to the longitudinal direction of the vehicle in order to tension the roller blind.

20 Claims, 4 Drawing Sheets

GUIDE SYSTEM FOR A ROLLER BLIND OF A SLIDING ROOF SYSTEM

RELATED APPLICATIONS

The application claims priority to European Patent Application 07 002 092.0, which was filed Jan. 31, 2007.

BACKGROUND OF THE INVENTION

The invention relates to a guide system for a roller blind of a sliding roof system.

A roller blind, which can be displaced in a guide rail, can be fitted below an opening in a vehicle roof in order to cover the opening to a greater or lesser extent in accordance with vehicle occupant requirements. If the opening is to be uncovered, the roller blind is wound up on a winding spindle. The roller blind can then be pulled out from the winding spindle to cover the opening when needed. This operation can take place both manually and electrically. Longitudinal edges of the roller blind are accommodated in guide rails such that the roller blind is kept tensioned transversely with respect to the displacement direction. This prevents the roller blind from sagging into a vehicle interior when the roller blind is positioned below the opening in the vehicle roof. The sagging is undesirable for visual reasons, and, furthermore, accommodating the roller blind in the guide rails prevents flapping.

To keep the roller blind tensioned between the guide rails without a large outlay, DE 10 2004 033 982 A1 discloses a guide rail with a flexible, resilient connecting section made of plastic, which couples a holding section and a guide section to each other in a resilient manner. The holding section is used to fasten the guide rail to a vehicle, and the guide section accommodates the roller blind. The connecting section tensions the roller blind. In a starting position, a distance between the two lateral guide sections for the roller blind is greater than actually necessary. If the roller blind is subsequently displaced along the guide sections, the two guide sections are pulled closer to each other, and in the process, the connecting section yields flexibly.

There is a need for a guide system that can keep a roller blind tensioned, and which is constructed more compactly.

SUMMARY OF THE INVENTION

A guide system for a roller blind of a sliding roof system is provided with a fixed guide rail and a slider that is fixed on the roller blind. The slider is accommodated in the guide rail in a manner such that the slider can be displaced in a longitudinal direction of a vehicle and carries the roller blind. A pretensioning device, which is arranged between the guide rail and the slider, endeavors to press the slider outwards transversely with respect to the longitudinal direction of the vehicle in order to tension the roller blind. This is based on a concept of providing tolerance compensation in the form of a pretensioning device in terms of force between the guide rail of the roller blind and the slider. The pretensioning device presses the slider, which is fixed on the roller blind, outwards transversely with respect to the longitudinal direction of the vehicle, which tensions the roller blind. The pretensioning device compensates for fluctuations in the size of the roller blind material due to manufacturing processes, and for thermally induced changes in length (expansion/shrinkage) in a direction transverse with respect to the direction of movement of the roller blind.

In one example, an intermediate guide is used to guide the slider. The intermediate guide is arranged within the guide rail and, in particular, can be moved transversely with respect to the longitudinal direction of the vehicle. This configuration makes it possible to design the intermediate guide to have little friction whereas, in the case of the pretensioning device, value can be placed in particular on the flexibility.

The pretensioning device is arranged, in particular, locally and/or in terms of force, between the guide rail and the intermediate guide. The pretensioning device acts on the intermediate guide in which the slider is guided.

The intermediate guide in turn is mounted in the guide rail in a manner such that the intermediate guide can be moved transversely with respect to the longitudinal direction of the vehicle, which makes the system compact. The intermediate guide, which accommodates the slider, can be displaced transversely with respect to the longitudinal direction of the vehicle.

In one example, the intermediate guide extends, for the most part, over a displacement path of the roller blind.

The intermediate guide sits in the guide rail in a manner such that the intermediate guide cannot be displaced in the longitudinal direction of the vehicle. The intermediate guide, which is designed to be displaced transversely with respect to the longitudinal direction of the vehicle, i.e. in the y-direction, is therefore mounted, with the roller blind fastened thereto, in a manner such that the intermediate guide floats in the y-direction.

The pretensioning device can be formed, for example, by a steel spring.

In another example, the pretensioning device has a flexible plastic body. The force with which the roller blind is pulled outwards transversely with respect to the longitudinal direction of the vehicle can be set by the hardness of the material used and/or by the geometry of the plastic body.

The plastic body is formed, for example, from ethylene-propylene-diene-monomer rubber ("EPDM").

According to one embodiment, the plastic body is generally U-shaped and has two limbs for obtaining the pre-stressing force. The limbs are deformed in order to achieve the pre-stressing force.

At least one recess is provided in the limbs of the generally U-shaped plastic body. The recesses ensure that the plastic body can be compressed and decompressed in a flexible manner, with a spring property of the plastic body being set by the arrangement and design of the recess.

In particular, the at least one recess extends over an entire length of the plastic body such that the spring property of the plastic body is identical over the entire length.

The pretensioning device is accommodated in the guide rail such that the pretensioning device is positionally fixed in the longitudinal direction of the vehicle.

The pretensioning device accommodates the slider, which is fixed on the roller blind, in order to achieve a form-fitting connection.

According to one example, the pretensioning device has two magnets, with a flexible plastic body being arranged between the two magnets. The magnets produce a laterally outwardly acting force for pretensioning the roller blind. The magnets are two opposite pole magnets that attract each other. The flexible plastic body is arranged between the magnets and is compressed by the attraction force of the two magnets to exert pretensioning on the cover.

Part of the pretensioning device is embedded in the intermediate guide. As the slider is guided in the intermediate guide, the intermediate guide is pulled together with a first magnet embedded therein by a second magnet that is outwards transversely with respect to the longitudinal direction of the vehicle.

Sections of the pretensioning device may be provided along the length of a displacement path of the roller blind.

In one example, the pretensioning device is provided over essentially the entire length of a displacement path of the roller blind such that the roller blind is subjected over its entire displacement path to a force outwards transversely with respect to the longitudinal direction of the vehicle.

These and other features of the present invention can be best understood from the following specification and drawings, the following of which is a brief description.

DETAILED DESCRIPTION OF THE PREFERRED EMBODIMENT

Figure 1:
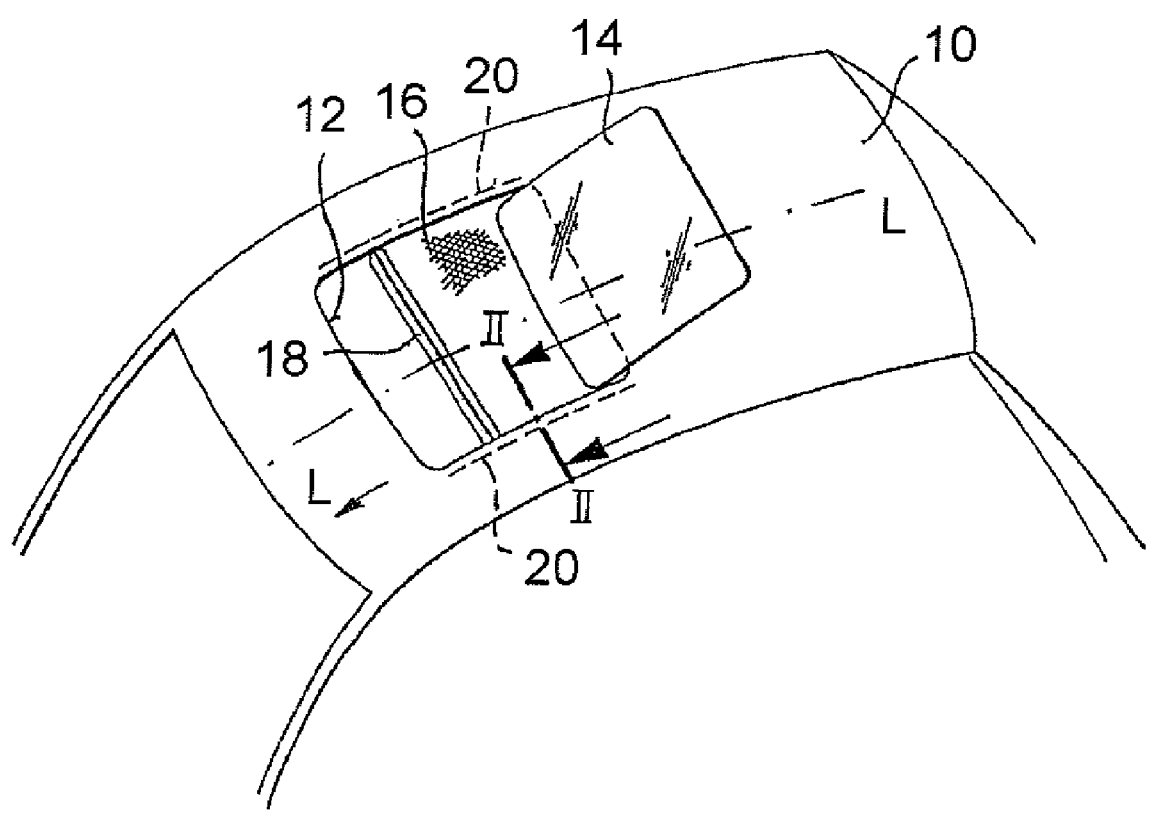
FIG. 1 shows a perspective view of a vehicle roof with a roller blind that is guided in a guide system.

FIG. 1 shows a vehicle roof 10 with an opening 12. The opening 12 is assigned a cover 14 of a sliding roof system. The cover 14 can be displaced between a closed position in which the cover 14 closes the opening 12 and an open position, which is shown in FIG. 1. A roller blind 16 is arranged below the cover 14 and also below the opening 12. The roller blind 16 can be displaced, with respect to the vehicle, forwards (in a longitudinal direction L of the vehicle) and rearwards (counter to the longitudinal direction L of the vehicle), either manually or by being driven by a motor. If the roller blind 16 is pushed completely to the rear, the opening 12 is completely uncovered. Fresh air and sunlight then gain free access to a vehicle interior. If the roller blind 16 is pushed completely forwards, then the opening 12 is covered by the roller blind 16. Fresh air and sunlight can therefore pass into the vehicle interior only to a limited extent.

The roller blind 16 is composed of flexible material, for example fabric or a plastic film. At a front edge there is a bow 18 that a vehicle occupant can grasp in order (in the case of manual actuation) to displace the roller blind 16 to the front or rear (in the longitudinal direction L or counter to the longitudinal direction L). The bow 18 is displaceably accommodated via a respective slider 21 in two guide rails 20 that extend longitudinally along laterally spaced edges of the opening 12.

Below the slider 21 (FIG. 2), two longitudinal edges of the roller blind 16, i.e. right and left edges of the roller blind 16, as viewed in the longitudinal direction L of the vehicle, are accommodated in the guide rails 20. For this purpose, the guide rails 20 each have a recess 23 that is opened towards the roller blind 16. The guide rails 20 are made, in particular, from a rigid material, such as aluminum, and are fastened inflexibly to the vehicle.

Along the longitudinal edges of the roller blind 16, i.e. in the region assigned to the guide rails 20, each roller blind 16 is provided with a slider 22 that is designed as thin metal or plastic strip extending over an entire length of the roller blind 16. The strip endeavors to wind itself up spirally, which provides a winding-up force for the roller blind 16.

The slider 22 is accommodated such that the slider 22 can be displaced in a guide section 26 of an intermediate guide 24 that extends essentially along an entire displacement path of the roller blind 16. The intermediate guide 24 is accommodated in the guide rail 20 in a manner such that the intermediate guide 24 cannot be displaced in the longitudinal direction L of the vehicle, and is mounted in the guide rail 20 such that the intermediate guide 24 can be moved transversely with respect to the longitudinal direction L of the vehicle.

Figure 2:
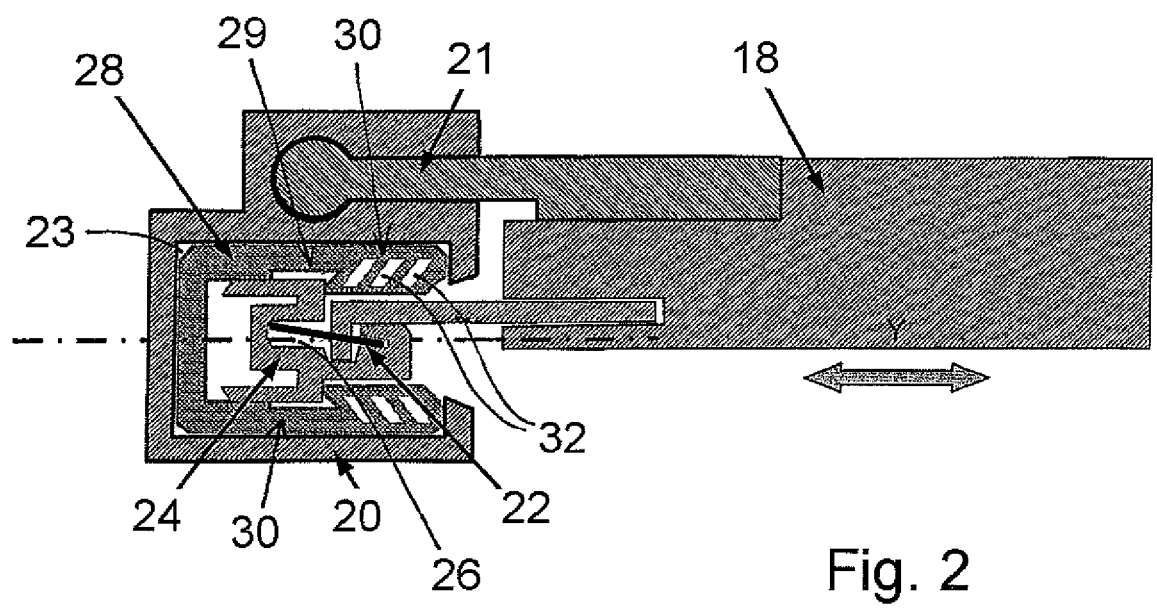
FIG. 2 shows, schematically, a section along the line II-II of FIG. 1 through a guide system in accordance with a first example.

The intermediate guide 24 is surrounded by a pretensioning device 28 that is accommodated in the guide rail 20 such that it is positionally fixed and extends along the entire displacement path of the roller blind 16. The pretensioning device 28 is a flexible, essentially U-shaped plastic body 29 which, in particular, is formed from EPDM and has two limbs 30 that bear against the guide rail 20. The intermediate guide 24 is accommodated in a form-fitting manner in the pretensioning device 28. Compressed ends of the limbs 30 of the U-shaped pretensioning device 28 serve as inwardly acting stops, and serve as an inside guide for the intermediate guide 24. The size of the roller blind 16 and the guide system is selected such that the limbs 30 are always compressed flexibly in the transverse direction in the region of the roller blind 16 such that the limbs 30 press the intermediate guide 24 (with the slider 22 and the roller blind 16) outwards transversely with respect to the longitudinal direction L of the vehicle. The limbs 30 include recesses 32 that increase the flexibility. FIG. 2 shows three recesses 32 in each case that are designed as parallelograms (as seen in cross section). The recesses 32 extend essentially over the entire length of the plastic body 29.

The pretensioning device 28, which is arranged between the guide rail 20 and the intermediate guide 24, and the limbs 30 that are supported on an inner part of the guide rail 20, subject the intermediate guide 24 to a force transversely with respect to the longitudinal direction L of the vehicle. The force, which is exerted by the pretensioning device 28 and acts outwards transversely with respect to the longitudinal direction L of the vehicle, keeps the roller blind 16 tensioned. Owing to the flexibility of the pretensioning device 28, the tensioning forces exerted on the roller blind 16 remain at a comparatively low level, and therefore only small frictional forces occur between the slider 22 of the roller blind 16 and the intermediate guide 24. The forces exerted by the pretensioning device 28 can be set by the hardness of the plastic used, and by the number and shape of the recesses 32.

Figure 3:
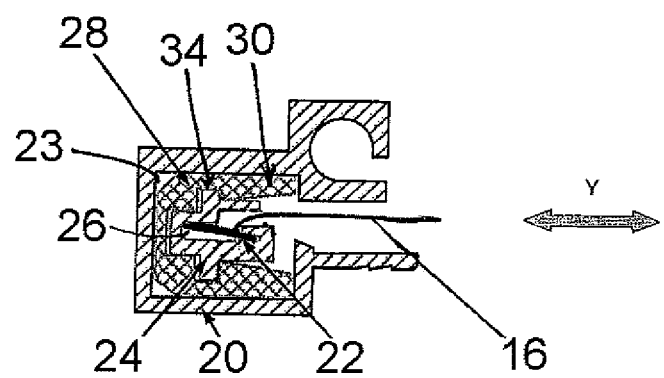
FIG. 3 shows, schematically, a section along the line II-II from FIG. 1 through a guide system in accordance with a second example.

FIG. 3 shows a second example of a guide system. The same reference numbers are used for the components known from the first example, and reference is made in this respect to the explanations above.

The essential difference between the first and second examples is that, in the case of the second example, the pretensioning device 28 does not have any recesses 32. The thickness of the limbs 30 of the pretensioning device 28 decreases in a direction towards the roller blind 16 in order to increase the flexibility. The intermediate guide 24 is accommodated in a form-fitting manner in notches 34 of the pretensioning device 28. Lateral pretensioning forces of the limbs 30 are transmitted to the intermediate guide 24 via the notches 34.

Figure 4:
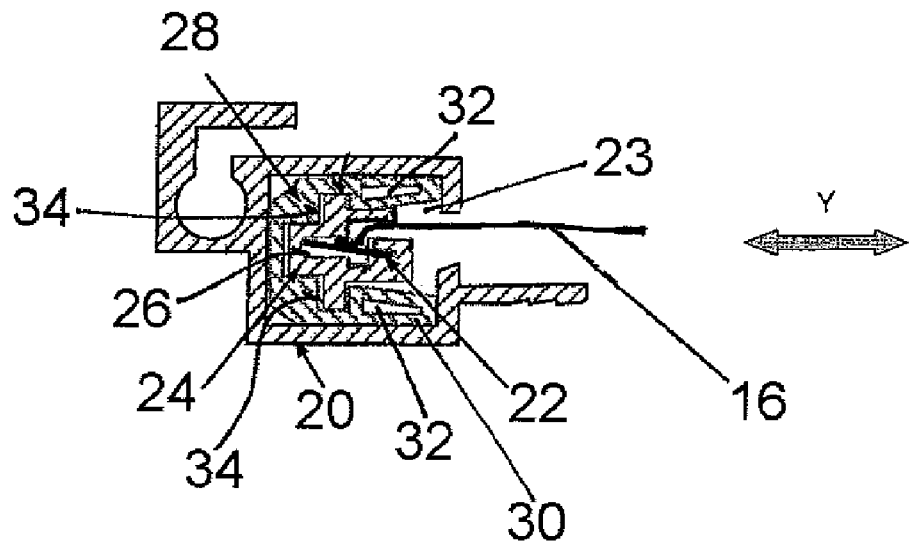
FIG. 4 shows, schematically, a section along the line II-II of FIG. 1 through a guide system in accordance with a third example.

FIG. 4 shows a third example. The same reference numbers are used for the components known from the first and second examples, and reference is made in this respect to the explanations above. The third example differs from the second example only in that a respective large recess 32 is provided in each limb 30, with the thickness of the limbs 30 also decreasing in a direction towards the roller blind 16.

Figure 5:
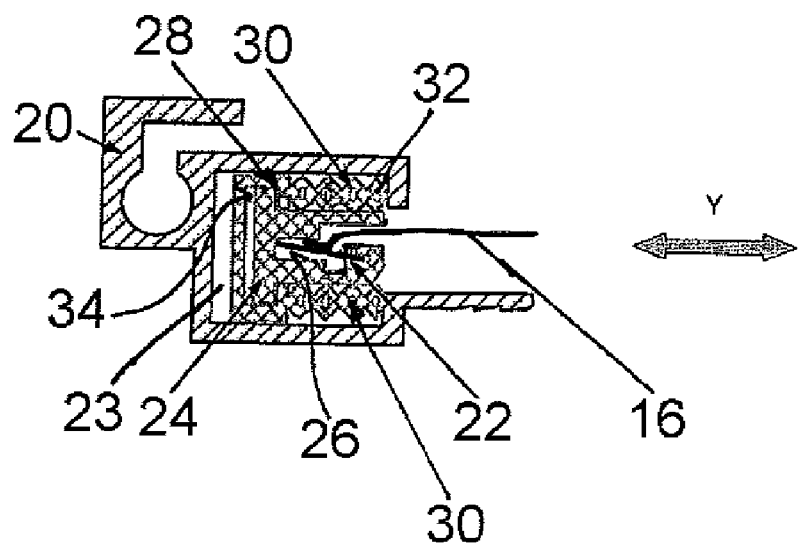
FIG. 5 shows, schematically, a section along the line II-II of FIG. 1 through a guide system in accordance with a fourth example.

FIG. 5 shows a fourth example. The same reference numbers continue to be used for the components which are already known.

The limbs 30 of the essentially U-shaped plastic body 29 are designed in the manner of bellows. Each limb 30 essentially comprises four overlapping diamond-shaped elements and has four recesses 32.

In the position shown, a left edge of the pretensioning device 28 does not bear against the guide rail 20. This is because the pretensioning device 28 here is shown in a position in which the limbs 30 are very greatly compressed.

Figure 6:
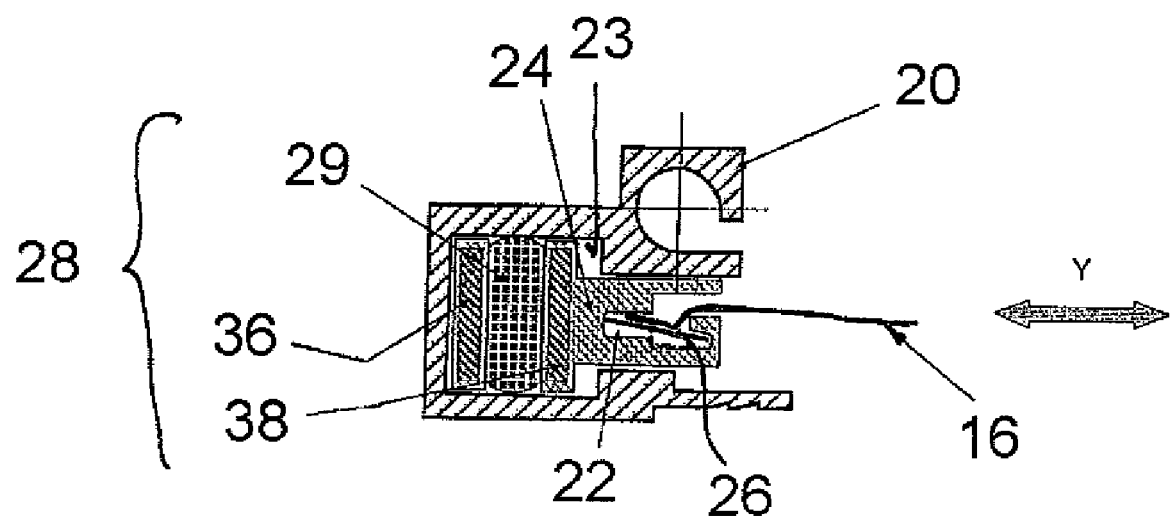
FIG. 6 shows, schematically, a section along the line II-II of FIG. 1 through a guide system in accordance with a fifth example.

FIG. 6 shows a fifth example. The fifth example differs from the other examples in that the pretensioning device 28 has a rectangular plastic body 29 (as seen in cross section) and two magnets 36, 38. The flexible plastic body 29 is provided between the two magnets 36, 38. The left magnet 36 (with reference to FIG. 6) is fitted on the guide rail 20. The right magnet 38 (with reference to FIG. 6) is embedded in the intermediate guide 24. The two opposite pole magnets 36, 38, or numerous magnets 36, 38 arranged consecutively, extend over the entire length of the displacement path of the roller 16 and attract each other.

The mutual attraction force of the magnets 36, 38 compresses the plastic body 29 located between them. The right magnet can thus be displaced in the y-direction and, as a result, can exert a tensioning force on the roller blind 16. The tensioning force obtained can be set via the hardness of the plastic body 29, and via the attraction force of the particular electromagnetic magnets 36, 38.

The left magnet 36 does not absolutely have to be fitted on the guide rail 20.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A guide system for a roller blind of a sliding roof system comprising:
   a guide rail;
   an intermediate guide accommodated in the guide rail;
   a slider fixed on a roller blind, the slider being accommodated in the intermediate guide such that the slider is displaceable in a longitudinal direction and carries the roller blind; and
   a pretensioning device arranged between the guide rail and the intermediate guide, wherein the pretensioning device has a flexible plastic body that is generally U-shaped and has two flexible limbs that exert a pretensioning force, and wherein the intermediate guide is positioned and guided between the flexible limbs, the pretensioning device pressing the intermediate guide outwards transversely with respect to the longitudinal direction in order to tension the roller blind.

2. The guide system according to claim 1, wherein the intermediate guide is mounted in the guide rail to be moveable transversely with respect to the longitudinal direction.

3. The guide system according to claim 1, wherein the intermediate guide extends over a displacement path of the roller blind.

4. The guide system according to claim 1, wherein the intermediate guide sits in the guide rail such that the intermediate guide cannot be displaced in the longitudinal direction.

5. The guide system according to claim 1, wherein the flexible plastic body is formed from ethylene-propylene-diene-monomer rubber.

6. The guide system according to claim 1, including at least one recess in each of the two limbs of the flexible plastic body.

7. The guide system according to claim 6, wherein the at least one recess extends over an entire length of the flexible plastic body.

8. The guide system according to claim 1, wherein the pretensioning device is accommodated in the guide rail such that the pretensioning device is positionally fixed in the longitudinal direction of the vehicle.

9. The guide system according to claim 1, wherein the pretensioning device accommodates the slider which is fixed on the roller blind.

10. The guide system according to claim 1, wherein sections of the pretensioning device are provided along a length of a displacement path of the roller blind.

11. The guide system according to claim 1, wherein the pretensioning device is provided over essentially an entire length of a displacement path of the roller blind.

12. The guide system according to claim 1, wherein the slider is one of a metal and plastic strip that is fitted along a roller blind edge and provides a winding-up force for the roller blind.

13. The guide system according to claim 1, wherein the flexible plastic body has an opening facing the roller blind.

14. The guide system according to claim 1, wherein the intermediate guide is guided by the pretensioning device exclusively in a direction transversely with respect to the longitudinal direction.

15. The guide system according to claim 1, wherein the flexible limbs have protrusions at their free edges and the intermediate guide is accommodated in a form-fitting manner in the pretensioning device.

16. A guide system for a roller blind of a sliding roof system of a vehicle comprising:
   a guide rail;
   an intermediate guide accommodated in the guide rail;
   a slider fixed on the roller blind, the slider being accommodated in the intermediate guide such that the slider is displaceable in a longitudinal direction and carries the roller blind; and
   a pretensioning device arranged between the guide rail and the intermediate guide, wherein the pretensioning device is of flexible plastic and has two flexible limbs that exert a pretensioning force, the pretensioning device pressing the intermediate guide outwards transversely with respect to the longitudinal direction in order to tension the roller blind, wherein the pretensioning device and the intermediate guide are fully housed within the guide rail.

17. The guide system according to claim 16, wherein the intermediate guide is mounted in the guide rail to be moveable transversely with respect to the longitudinal direction.

18. The guide system according to claim 16, wherein the intermediate guide extends over a displacement path of the roller blind.

19. The guide system according to claim 16, wherein the intermediate guide sits in the guide rail such that the intermediate guide cannot be displaced in the longitudinal direction.

20. The guide system according to claim 16, wherein the flexible limbs have protrusions at their free edges and the intermediate guide is accommodated in a form-fitting manner in the pretensioning device.

* * * * *